No. 609,728. Patented Aug. 23, 1898.
H. J. BOLINSKI.
STOCK FEEDER AND WATERER.
(Application filed Aug. 11, 1897.)
(No Model.) 2 Sheets—Sheet 1.
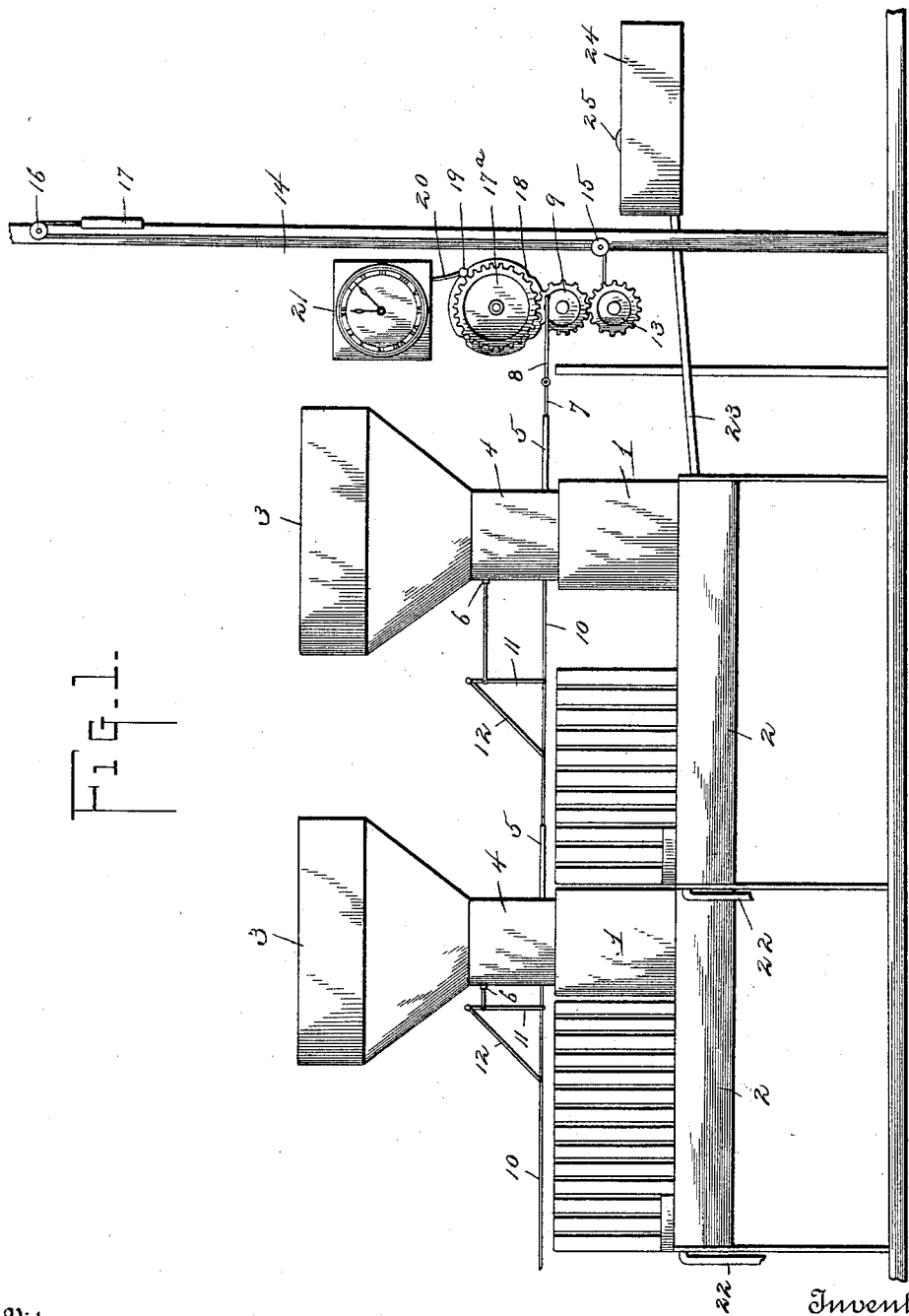
Witnesses
Harry L. Amer.
Victor J. Evans.
Inventor
Herman J. Bolinski.
by John Wedderburn
Attorney

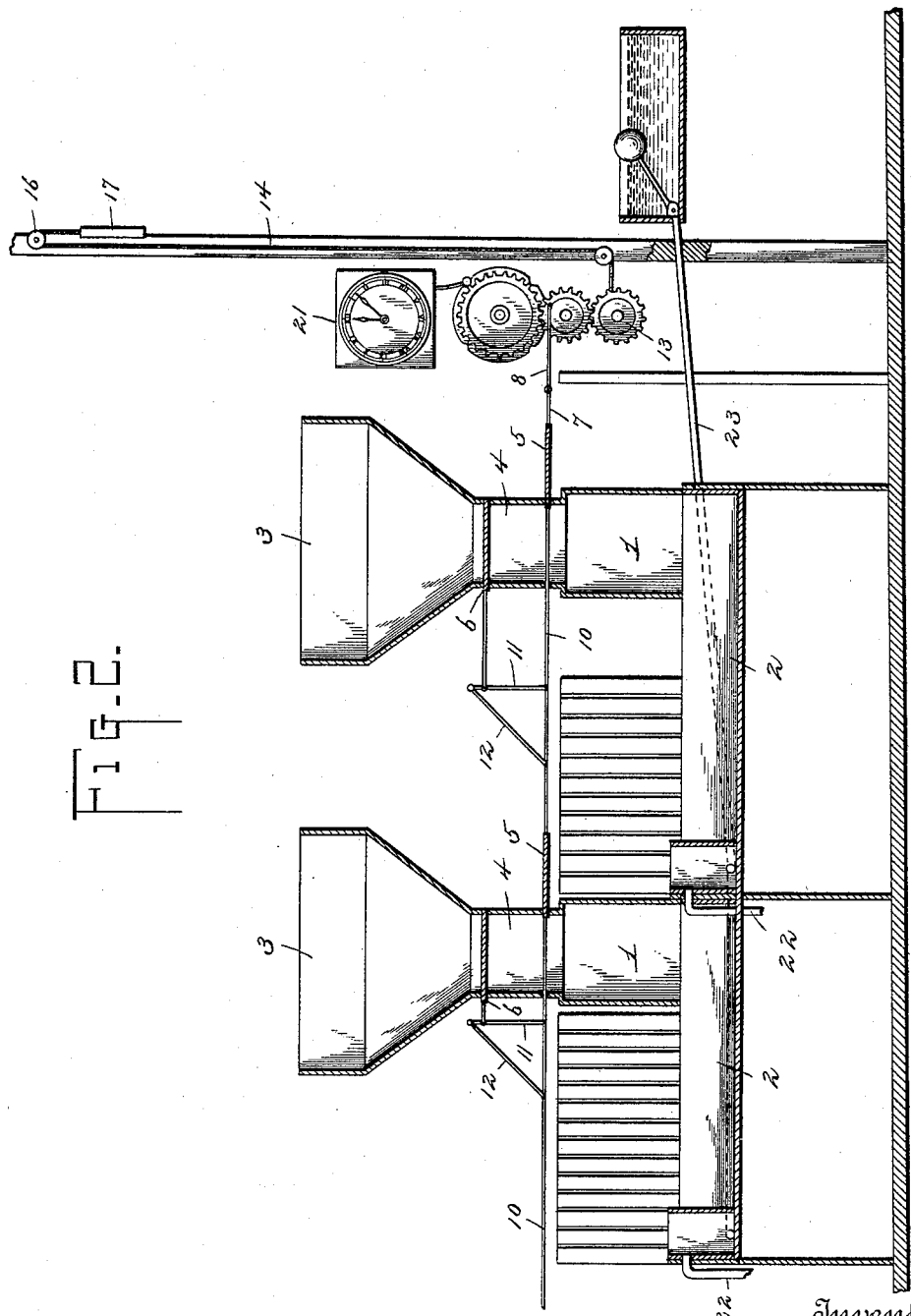

UNITED STATES PATENT OFFICE.

HERMAN J. BOLINSKI, OF NEW LONDON, WISCONSIN.

STOCK FEEDER AND WATERER.

SPECIFICATION forming part of Letters Patent No. 609,728, dated August 23, 1898.

Application filed August 11, 1897. Serial No. 647,785. (No model.)

*To all whom it may concern:*

Be it known that I, HERMAN J. BOLINSKI, of New London, in the county of Waupaca and State of Wisconsin, have invented certain new and useful Improvements in Stock Feeders and Waterers; and I do hereby declare the following to be a full, clear, and exact description of the invention, such as will enable others skilled in the art to which it appertains to make and use the same.

The invention relates to an apparatus for feeding and watering stock in which the feed mechanism is connected with an alarm-clock to be automatically operated thereby for supplying the stock with food at regular intervals.

It will be understood from the following description and claims, reference being had to the accompanying drawings, in which—

Figure 1 is a front elevation showing two stalls arranged side by side, and Fig. 2 represents a longitudinal vertical section.

1 indicates a feed-box applied to a stall under any usual or preferred arrangement, and 2 indicates a water-trough arranged, preferably, at the side or corner of the stall or in front of the feed-box 1 for giving ready access of the horse or other animal thereto.

3 indicates a feed bin or hopper, and 4 a supply-chute connecting the feed-bin with the feed-box. The chute 4 is slotted upon its opposite sides at or near its bottom to receive a slide 5 upon one side thereof, and upon its opposite side above the slide 5 is provided with two or more slots adapting it to receive a slide 6, which may be adjusted up and down in the chute for measuring the quantity of food to be supplied. The slide 5 is connected with a rod 7, which in turn is connected by a link 8 with the crank-wheel 9, which by a single revolution is adapted to impart a back-and-forth movement to the slide 5, or, in other words, to draw the slide out for depositing in the box 1 the grain above the slide and to return the slide 5 to its normal position for again closing the chute. The slide 5 has connected with it a rod 10, or said rod may form an extension of the rod 7, and has connected with it an upright 11, suitably supported upon the rod 10 or 7, as the case may be, by means of a brace 12. The slide 6 is connected with the upright 11, and under the arrangement of the slides it will be seen that if the slide 5 is drawn out of the chute for opening the bottom of the same the slide 6 will be drawn into the chute, closing the latter above the ways in which the slide 5 moves. The crank-wheel 9 is geared to a cord-pulley or drum 13, from which a cord 14 extends underneath a guide shaft or pulley 15, thence up over a guide shaft or pulley 16, its end overhanging the last-named pulley being connected with a weight 17. These cord-pulleys may be connected with a suitable post or with the side walls of the stall in a manner that will be readily understood. The crank-wheel 9 is geared to larger wheel $17^a$, provided at intervals with shoulders 18, with which a pawl 19 engages, said pawl being connected at its free end with a rod or link 20, connecting it with the alarm of a clock (indicated at 21) which may be of any suitable construction of alarm-clock, adapting it to trip the wheel $17^a$ by lifting the pawl 19 out of engagement therewith at regular intervals in a manner that will be readily understood.

When the pawl 19 is lifted out of engagement with the wheel $17^a$, it is set in motion by means of a weight connected with a band-wheel 13 and a single revolution is imparted to it, the pawl 19 being released from the alarm in time to adapt it to again engage the crank-wheel 9 at the end of a single revolution. In the revolution of the crank a movement out and in of the slide 5 and in and out of the slide 6 is effected, for the purpose and in the manner above described. The rod 7 or 10 may be extended to be connected with a series of stalls arranged side by side in such manner that the feed appliances connected therewith may be simultaneously operated for supplying the several feed-boxes. The trough 2 may be extended in like manner to supply the several stalls and is provided at 22 with an overflow-pipe for drawing off any surplus of water that may at any time be admitted to the trough. The trough is connected by means of a pipe 23 with a tank 24, which is similar in construction to an ordinary flush-tank, being supplied with a float at 25, which controls the supply of water to the tank, and which may be supplied thereto by means of a water-supply pipe connected to said tank in any usual or suitable manner. The valve controlling the outlet of water from the tank to the pipe 23 is designed in practice to be connected with a clock mechanism to be operated automatically thereby in a manner similar to the operation of the feed mechanism described but it may be operated by a float or in any suitable manner. By the employment of a clock with alarm mechanism arranged to trip the feed-apparatus described at regular intervals the stock may be automatically supplied during the absence of the regular attendant, and, if necessary, by the employment of an eight-day clock for a number of days at a time without attention from the attendant.

Having thus described the invention, what I claim as new, and desire to secure by Letters Patent, is—

1. The combination in an apparatus for feeding and watering stock, of a feed box or hopper, a feed-supply chute connected therewith and provided with connected slides arranged one above another to operate from opposite sides of the chute, whereby when one is drawn out the other is drawn in, a single reciprocating rod connected to said lower and upper slides to operate them simultaneously to close one and open the other, a crank-wheel connected to said rod for operating it, mechanism connected to said crank-wheel for actuating it, and a clock mechanism connected to said crank-actuating mechanism for tripping the latter, substantially as described.

2. The combination in a stock feed and watering device, of a feed-slide-actuating mechanism a clock mechanism connected to said feed-slide mechanism for tripping the latter at predetermined intervals, a feed hopper and chute, connected lower and upper slides in said chute operating simultaneously from opposite sides thereof the one to open and the other to close the chute, said slide-actuating mechanism consisting of a single reciprocating rod connected to said slides, a crank-wheel to which said rod is connected, and means for actuating said crank-wheel to impart a single revolution thereto when tripped and released by the clock mechanism, substantially as described.

3. In a stock-feeding device, the combination with the feed-hoppers and the chutes thereof, of connected lower and upper slides arranged to operate from opposite sides of the chutes, one to open and another to close the same, the reciprocating rod 10 connected to the slides 5 and carrying uprights 11 connected to the slides 6, a crank-wheel 9 connected to said rod for actuating the slides, a cord-drum 13 geared to said crank-wheel and carrying a weight for actuating it, a notched or shouldered wheel $17^a$ geared to the crank-wheel, and a clock mechanism provided with a tripping arm or pawl engaging the said shouldered wheel said clock mechanism being adapted to actuate said arm at predetermined intervals to release said wheel, substantially as described.

In testimony whereof I have signed this specification in the presence of two subscribing witnesses.

HERMAN J. BOLINSKI.

Witnesses:
G. W. CORNISH,
A. A. WEBBER.